United States Patent
Klassen et al.

(10) Patent No.: US 8,508,547 B2
(45) Date of Patent: Aug. 13, 2013

(54) DYNAMIC THEME COLOR PALETTE GENERATION

(75) Inventors: Gerhard Dietrich Klassen, Waterloo (CA); Shaul S. Wisebourt, Waterloo (CA); Lawrence Edward Kuhl, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 13/584,173

(22) Filed: Aug. 13, 2012

(65) Prior Publication Data

US 2012/0306743 A1 Dec. 6, 2012

Related U.S. Application Data

(63) Continuation of application No. 13/308,677, filed on Dec. 1, 2011, now Pat. No. 8,259,129, which is a continuation of application No. 13/006,546, filed on Jan. 14, 2011, now Pat. No. 8,089,491, which is a continuation of application No. 12/617,989, filed on Nov. 13, 2009, now Pat. No. 7,884,833, which is a continuation of application No. 11/416,194, filed on May 3, 2006, now Pat. No. 7,646,392.

(51) Int. Cl.
| | |
|---|---|
| G09G 5/00 | (2006.01) |
| G09G 5/02 | (2006.01) |
| G06F 17/00 | (2006.01) |
| G06F 3/048 | (2013.01) |
| G06F 3/14 | (2006.01) |
| G06T 7/00 | (2006.01) |
| G06T 11/40 | (2006.01) |

(52) U.S. Cl.
USPC ........... 345/593; 345/581; 345/589; 345/594; 358/518; 358/519; 382/167; 382/162; 382/276; 715/700; 715/867; 715/764

(58) Field of Classification Search
USPC . 345/581, 589–594, 418, 619; 358/518–519, 358/447–448, 543; 382/162, 167, 276; 715/700, 764, 867, 200, 273, 275
See application file for complete search history.

(56) References Cited

U.S. PATENT DOCUMENTS

| | | | |
|---|---|---|---|
| 4,689,669 | A | 8/1987 | Hoshino et al. |
| 4,907,075 | A | 3/1990 | Braudaway |

(Continued)

FOREIGN PATENT DOCUMENTS

| | | |
|---|---|---|
| WO | 94/16405 | 7/1994 |
| WO | 2005/019958 | 3/2005 |

OTHER PUBLICATIONS

Canadian Office Action dated Nov. 23, 2011 issued by the Canadian Intellectual Property Office relating to Canadian Patent Application No. 2,587,034.

(Continued)

*Primary Examiner* — Wesner Sajous
(74) *Attorney, Agent, or Firm* — Gowling Lafleur Henderson LLP

(57) ABSTRACT

There is provided a method of changing a theme for a user interface of a computer system comprising receiving an identification of an image with which to define a color palette of a theme for rendering elements of a user interface on a color display of the computer system; analyzing the image to determine at least one predominant color; and defining the color palette in response to the analysis. The image may comprise a background image selected by a user for display by the computer system. Dynamic generation of the color palette matches the user interface to colors to provide flexible and appealing themes. A computer readable memory having recorded thereon instructions to carry out this method is also provided, as well as a device comprising such memory.

20 Claims, 3 Drawing Sheets

(56) References Cited

U.S. PATENT DOCUMENTS

| | | | |
|---|---|---|---|
| 5,371,844 A | 12/1994 | Andrew et al. | |
| 5,416,890 A * | 5/1995 | Beretta | 345/590 |
| H1506 H | 12/1995 | Beretta | |
| 5,615,320 A | 3/1997 | Lavendel | |
| 5,802,361 A * | 9/1998 | Wang et al. | 382/217 |
| 5,874,988 A | 2/1999 | Gu | |
| 5,905,492 A | 5/1999 | Straub et al. | |
| 5,905,493 A | 5/1999 | Belzer et al. | |
| 5,917,487 A | 6/1999 | Ulrich | |
| 6,104,391 A | 8/2000 | Johnston et al. | |
| 6,188,399 B1 | 2/2001 | Voas et al. | |
| 6,518,981 B2 | 2/2003 | Zhao et al. | |
| 7,646,392 B2 * | 1/2010 | Klassen et al. | 345/593 |
| 7,884,833 B2 * | 2/2011 | Klassen et al. | 345/593 |
| 8,089,491 B2 * | 1/2012 | Klassen et al. | 345/593 |
| 8,259,129 B2 * | 9/2012 | Klassen et al. | 345/593 |
| 2001/0021937 A1 | 9/2001 | Cicchitelli et al. | |
| 2001/0040983 A1 | 11/2001 | Nishikawa | |
| 2003/0058278 A1 | 3/2003 | Allen | |
| 2003/0063126 A1 | 4/2003 | Yanchar et al. | |
| 2003/0231204 A1 | 12/2003 | Hanggie et al. | |
| 2004/0000172 A1 | 1/2004 | Apollonio | |
| 2004/0056897 A1 | 3/2004 | Ueda | |
| 2004/0216054 A1 | 10/2004 | Mathews et al. | |
| 2005/0078327 A1 | 4/2005 | Majewicz | |
| 2006/0059430 A1 | 3/2006 | Bells et al. | |
| 2006/0066629 A1 | 3/2006 | Norlander et al. | |
| 2007/0041540 A1 | 2/2007 | Shao et al. | |
| 2007/0078735 A1 | 4/2007 | Wan et al. | |
| 2007/0176945 A1 | 8/2007 | Moran et al. | |
| 2008/0062192 A1 | 3/2008 | Voliter et al. | |

OTHER PUBLICATIONS

Canadian Office Action dated Jun. 17, 2010 issued by the Canadian Intellectual Property Office relating to Canadian Patent Application No. 2,587,034.

Extended European Search Report dated Mar. 28, 2007 issued by the European Patent Office relating to European Patent Application No. 06113422.7.

Gasparini, F. et al., "Color Balancing of Digital Photos Using Simple Image Statistics", Pattern Recognition, Elsevier, Kidlington, GB; Jun. 2004, vol. 37, No. 6, pp. 1201-1217, XPOO4505321.

"Plazmic Theme Builder for Blackberry", version 4.1, User Guide, published 2005, Plazmic, Inc., Waterloo, Canada (http://www.plazmic.com/en/download/index.shtml).

* cited by examiner

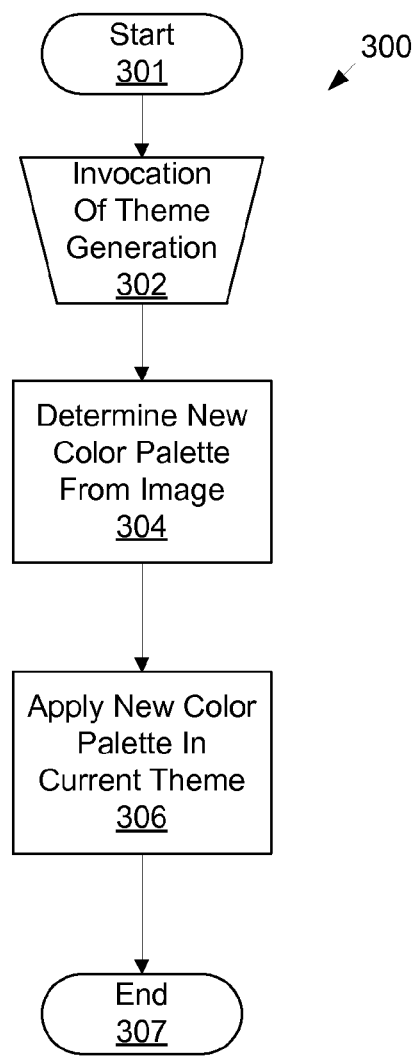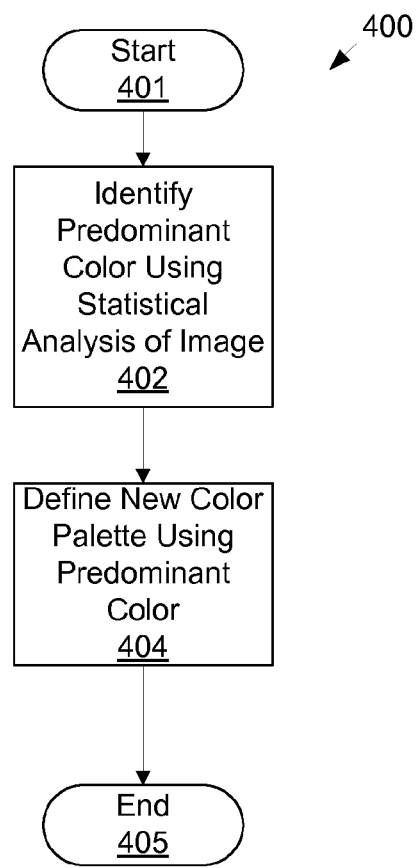
FIG. 3
FIG. 4

DYNAMIC THEME COLOR PALETTE GENERATION

CROSS REFERENCE TO RELATED APPLICATION

This application is a continuation of earlier non-provisional application having application Ser. No. 13/308,677 filed Dec. 1, 2011, now U.S. Pat. No. 8,259,129, granted on Sep. 4, 2012 and claims priority under 35 U.S.C. 120 thereto, which in turn is a continuation of earlier non-provisional application having application Ser. No. 13/006,546 filed Jan. 14, 2011 now U.S. Pat. No. 8,089,491, granted on Jan. 3, 2012, application Ser. No. 12/617,989 filed Nov. 13, 2009 now U.S. Pat. No. 7,884,833, granted on Feb. 8, 2011, which in turn is a continuation of earlier non-provisional application having application Ser. No. 11/416,194 filed May 3, 2006 now U.S. Pat. No. 7,646,392 granted on Jan. 12, 2010. The disclosure of aforementioned application Ser. Nos. 11/416, 194, 12/617,989, 13/006,546 and 13/308,677 are hereby incorporated by reference in their respective entireties.

FIELD

This application relates to the field of computer systems and more particularly to a method and system for dynamically generating a colour palette for a themed graphical user interface.

BACKGROUND

Computing devices including personal computers and mobile communication devices, such as cellular phones, personal digital assistants and the like comprise an operating system having a user interface. The operating system may also provide user interface support for software applications installed on the device. Often a windowing environment is provided by the user interface such that a window occupies a delineated area of a display monitor.

The user interface of the operating system (in some instances referred to as a "shell") and/or of the applications may be themed whereby user interface elements are provided with a common look and feel. The interface elements may include borders and controls which contribute to the visual appearance of the user interface and may include icons, cursors, object borders and shadowing, menus, lists, text boxes or input boxes, push buttons, radio buttons, scrollbars, toolbars, etc. In some instances theme packages defining the themed interface may reflect a particular subject (e.g. "jungle", "space". etc.). One important aspect of a theme for computing devices having color display capabilities is the color palette used to render the user interface elements.

In many user interfaces a desktop metaphor is applied whereby the display screen of the device visualizes a desktop having a background component over which user interface elements are displayed. In many user interfaces, the background component of the user interface may be configured to display an image or "wallpaper" behind foreground user interface elements. Users often demand flexibility and choice over the appearance of the user interface. One aspect of this choice of is the background image to be used.

Coordinating a colour palette to an particular background image to provide a pleasing and effective theme is problematic. Theme packages may be predefined with reference to predetermined images such that a choice of a particular theme invokes the choice of a particular background image or vice versa. However, user's often want to incorporate different images such as favourite color pictures, art work and/or graphics such as team logos, flags or corporate design trademarks the color of which may not pleasingly or effectively marry with a current color palette of the user interface. Thus there is a need to determine an appropriate color palette to use with a particular desktop image.

A solution to one or more of these issues is therefore desirable.

BRIEF DESCRIPTION OF THE DRAWINGS

Further features and advantages of the embodiments will become apparent from the following detailed description, taken in combination with the appended drawings, in which:

FIGS. 3 and 4 are flowcharts of operations for dynamically determining a colour palette in accordance with an embodiment.

It will be noted that throughout the appended drawings, like features are identified by like reference numerals.

DETAILED DESCRIPTION OF EMBODIMENTS

According to one aspect, there is provided a method of changing a theme for a user interface of a computer system. The method comprises: receiving input via the computer system identifying a color image to display as a component of the user interface, the color image for defining a color palette of the theme for rendering elements of the user interface on a color display of the computer system; analysing the color image using the computer system to determine at least one predominant color; defining the color palette using the computer system in response to the step of analysing; and rendering elements of the user interface on the color display in accordance with the color palette, the elements comprising one or more of icons, cursors, object borders and shadowing, menus, lists, text boxes, input boxes, push buttons, radio buttons, scrollbars and toolbars thereby to color coordinate the elements to the color image. The steps of analysing, defining and rendering are automatically invoked in response to the input identifying the color image to automatically generate the color palette and change the theme. The image may comprise a background image selected by a user for display by the computer system.

Analysing may comprise performing statistical analysis of data of the color image to determine said at least one predominant color. There may be a determining two or more palette candidates using the computer system for selection by a user to define the color palette. Dynamic generation of the color palette matches the user interface to color(s) of the image to provide flexible and appealing themes.

In accordance with another aspect, there is a provided computer system a computer system for changing a theme of a user interface. The computer system comprises a color display and a processor and memory configured to dynamically generate a color palette for rendering elements of the theme in response to input identifying a color image to display as a component of the user interface with which to define the color palette, the elements comprising one or more of icons, cursors, object borders and shadowing, menus, lists, text boxes, input boxes, push buttons, radio buttons, scrollbars and toolbars thereby to color coordinate the elements to the color image. The processor and memory are configured to: receive an identification of an image with which to define the color palette; and automatically analyse the color image to determine at least one predominant color for defining the color palette.

A computer readable memory having recorded thereon instructions to carry out the method is also provided. Other aspects will be apparent such as a communication device comprising such a memory.

Figure 1:
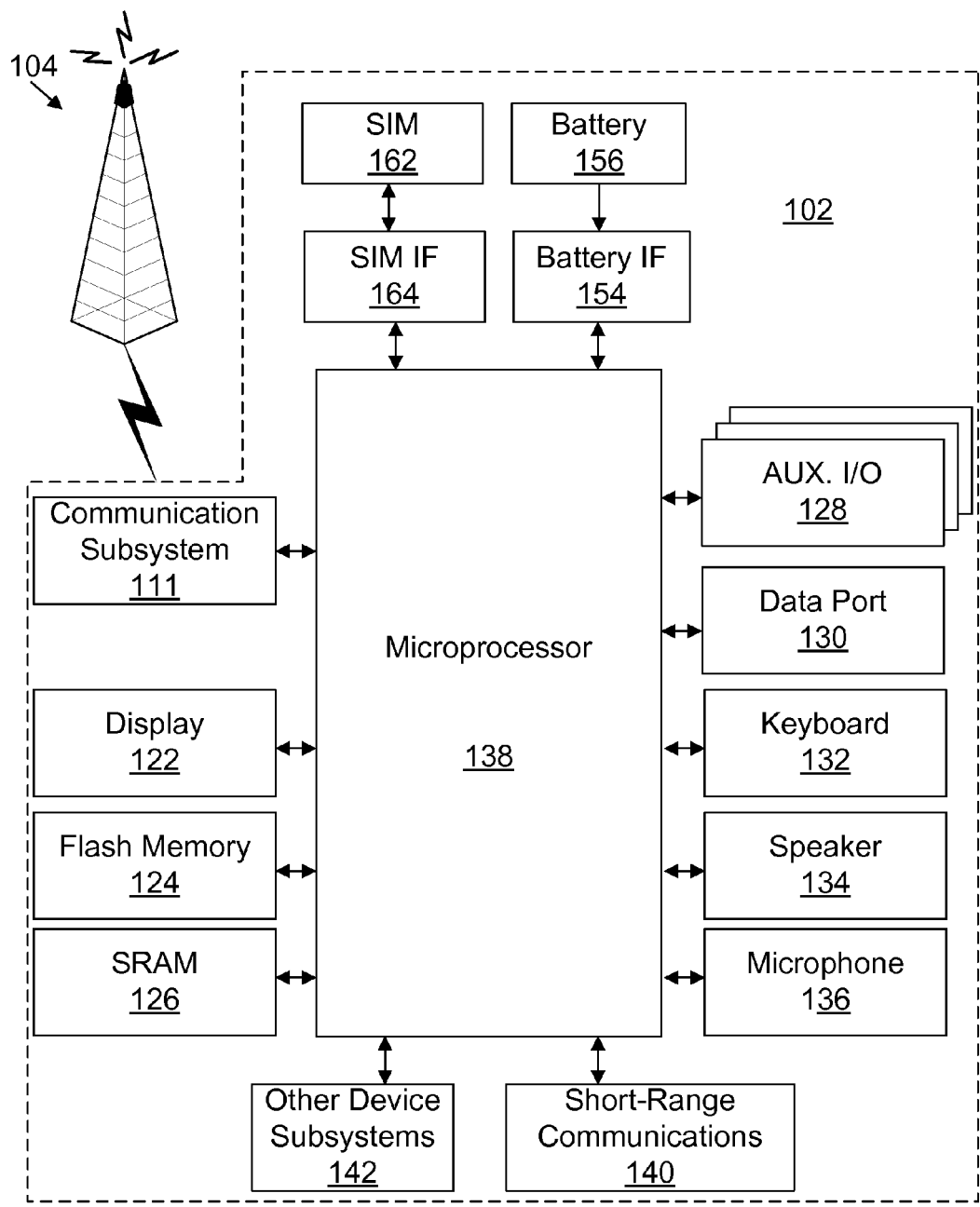
FIG. 1 is a block diagram of a wireless mobile device, an example computer system adapted in accordance with an embodiment and shown in communication with a wireless network.

FIG. 1 illustrates a representative example of a computer system, namely a wireless mobile communication device 102, adapted to dynamically determine a color palette for a user interface theme. Though described with reference to a wireless mobile device capable of voice and data communication and personal data assistant features, persons of ordinary skill in the art will appreciate that other computer systems may be adapted including personal computers such as desktops and laptops, workstations and the like.

Device 102 is a two-way communication device having at least voice and advanced data communication capabilities, including the capability to communicate with other computer systems. Depending on the functionality provided by device 102, it may be referred to as a data messaging device, a two way pager, a cellular telephone with data messaging capabilities, a wireless Internet appliance, or a data communication device (with or without telephony capabilities). Device 102 may communicate with any one of a plurality of fixed transceiver stations 104 (only one is shown) within its geographic coverage area. Persons of skill in the art will appreciate that voice communication capabilities are an optional feature and are not required to support the color palette determination techniques described herein.

Device 102 will normally incorporate a communication subsystem 111, which includes a receiver, a transmitter, and associated components, such as one or more (preferably embedded or internal) antenna elements and, local oscillators (LOs), and a processing module such as a digital signal processor (DSP) (all not shown). As will be apparent to those skilled in field of communications, particular design of communication subsystem 111 depends on the communication network in which device 102 is intended to operate.

Network access is associated with a subscriber or user of device 102 and therefore device 102 requires a Subscriber Identity Module or "SIM" card 162 to be inserted in a SIM IF 164 in order to operate in the network. Device 102 is a battery-powered device so it also includes a battery IF 154 for receiving one or more rechargeable batteries 156. Such a battery 156 provides electrical power to most if not all electrical circuitry in device 102, and battery IF 154 provides for a mechanical and electrical connection for it. The battery IF 154 is coupled to a regulator (not shown) that provides power V+ to all of the circuitry.

Device 102 includes a microprocessor 138 that controls overall operation of device 102. Communication functions, including at least data and voice communications, are performed through communication subsystem 111. Microprocessor 138 also interacts with additional device subsystems such as a display 122, a flash memory 124 or other persistent store, a random access memory (RAM) 126, auxiliary input/output (I/O) subsystems 128, a serial port 130, a keyboard 132, a speaker 134, a microphone 136, a short-range communications subsystem 140, and any other device subsystems generally designated at 142. Some of the subsystems shown in FIG. 1 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list. Operating system software used by microprocessor 138 is preferably stored in a persistent store such as flash memory 124, which may alternatively be a read-only memory (ROM) or similar storage element (not shown). Those skilled in the art will appreciate that the operating system, specific device applications, or parts thereof, may be temporarily loaded into a volatile store such as RAM 126.

Microprocessor 138, in addition to its operating system functions, preferably enables execution of software applications on device 102. A predetermined set of applications that control basic device operations, including at least data and voice communication applications, will normally be installed on device 102 prior to its release to users. A preferred application that may be loaded onto device 102 may be a personal information manager (PIM) application having the ability to organize and manage data items relating to the user such as, but not limited to, instant messaging (IM), e-mail, calendar events, voice mails, appointments, and task items. Naturally, one or more memory stores are available on device 102 and SIM 162 to facilitate storage of PIM data items and other information.

The PIM application preferably has the ability to send and receive data items such as email messages via the wireless network. In a preferred embodiment, PIM data items are seamlessly integrated, synchronized, and updated via the wireless network, with the mobile station user's corresponding data items stored and/or associated with a host computer system thereby creating a mirrored host computer on device 102 with respect to such items. This is especially advantageous where the host computer system is the mobile station user's office computer system. Additional applications may also be loaded onto device 102 through network (104), an auxiliary 110 subsystem 128, serial port 130, short-range communications subsystem 140, or any other suitable subsystem 142, and installed by a user in RAM 126 or preferably a non-volatile store (not shown) for execution by microprocessor 138. Such flexibility in application installation increases the functionality of device 102 and may provide enhanced on-device functions, communication-related functions, or both. For example, secure communication applications may enable electronic commerce functions and other such financial transactions to be performed using device 102.

In a data communication mode, a received signal such as a text message, an e-mail message, or web page download will be processed by communication subsystem 111 and input to microprocessor 138. Microprocessor 138 will preferably further process the signal for output to display 122 and/or to auxiliary I/O device 128. A user of device 102 may also compose data items, such as e-mail messages, for example, using keyboard 132 in conjunction with display 122 and possibly auxiliary I/O device 128. Keyboard 132 is preferably a complete alphanumeric keyboard and/or telephone-type keypad. These composed items may be transmitted over a communication network through communication subsystem 111 or short-range communication subsystem 140.

In the present embodiment, display 122 comprises a color display device that is capable of displaying a plurality of colors.

For voice communications, the overall operation of device 102 is substantially similar, except that the received signals would be output to speaker 134 and signals for transmission would be generated by microphone 136. Alternative voice or audio I/O subsystems, such as a voice message recording subsystem, may also be implemented on device 102. Although voice or audio signal output is preferably accomplished primarily through speaker 134, display 122 may also be used to provide an indication of the identity of a calling party, duration of a voice call, or other voice call related information, as some examples.

Data port 130 in FIG. 3 is normally implemented in a personal digital assistant (PDA)-type communication device for which synchronization with a user's desktop computer is a desirable, albeit optional, component. The data port can be serial or USB. The data port 130 enables a user to set preferences through an external device or software application and extends the capabilities of device 102 by providing for information or software downloads to device 102 other than through a wireless communication network. The alternate download path may, for example, be used to load an encryption key onto device 102 through a direct and thus reliable and trusted connection to thereby provide secure device communication.

Short-range communications subsystem 140 of FIG. 1 is an additional optional component that provides for communication between device 102 and different systems or devices, which need not necessarily be similar devices. For example, subsystem 140 may include an infrared device and associated circuits and components, or a Bluetooth™ communication module to provide for communication with similarly enabled systems and devices. Bluetooth is a registered trademark of Bluetooth SIG, Inc. A WiFi™ communication subsystem may also be employed.

Figure 2:
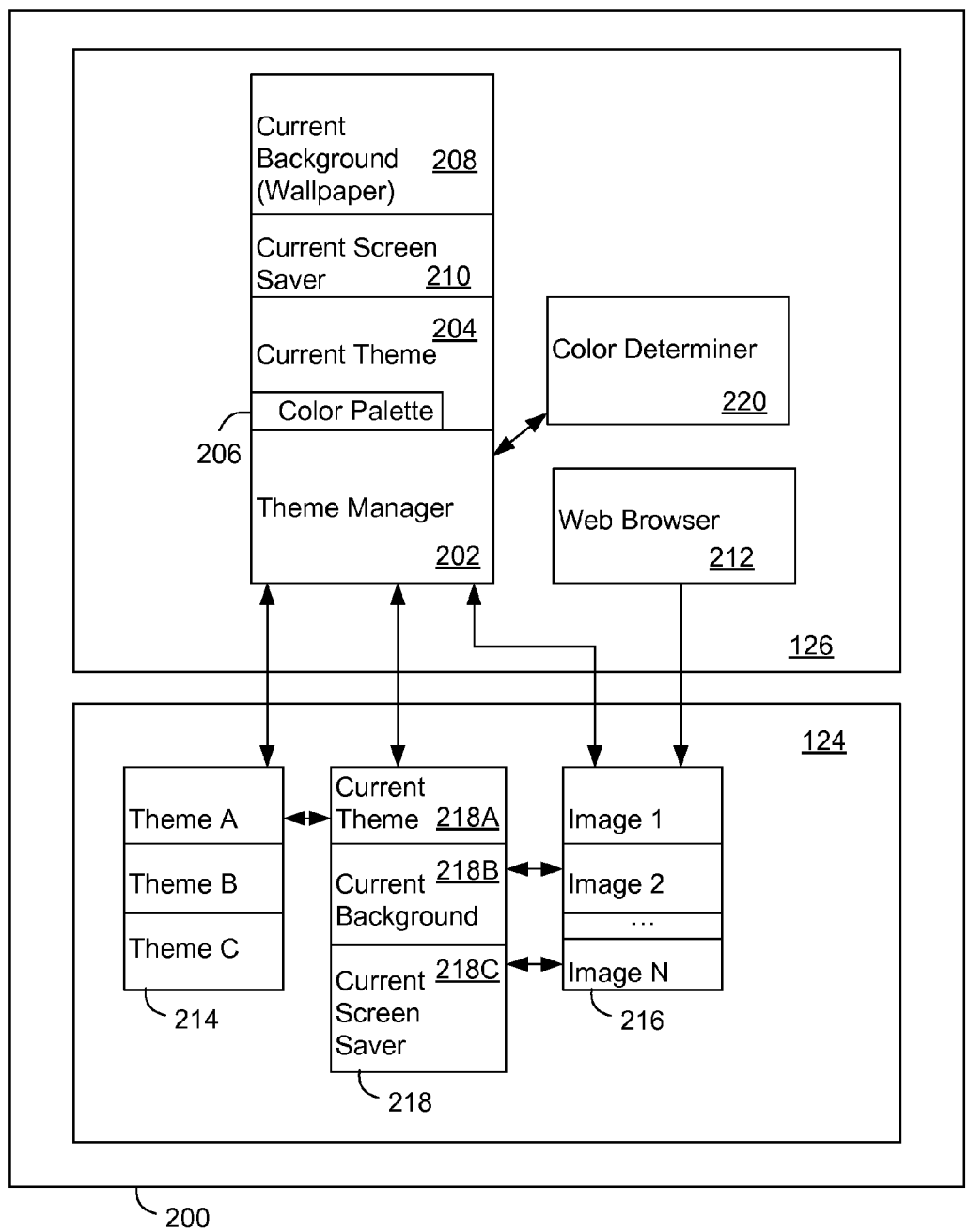
FIG. 2 is a block diagram of memory components of FIG. 1 showing software and data components in accordance with an embodiment.

FIG. 2 illustrates a notional view 200 of memory store components 124 and 126 of FIG. 1 in a representative embodiment and in which are stored instructions and data to configure processor 138 to dynamically determine a color palette for a theme.

Persistent store 124 stores theme data 214 for a plurality of defined user interface themes, namely Theme A, Theme B, and Theme C and images 216 for a plurality of images 1 to N. images may be stored in accordance with various common image formats such as .gif, .jpg, .bmp, .png, etc. Persistent store 124 also stores initialization data 218 for identifying a current theme 218A (e.g. themes 214), a current background image 218B (e.g. from images 216) and a current screen saver image 218C (e.g. from images 216) to apply upon start-up of device 102.

Volatile store 126 stores a theme manager component 202 adapted to apply theme data to user interface elements (not shown) for displaying on color-capable display 122. Theme data to apply comprises current theme data 204 which comprises a color palette 206 for rendering the elements in specific colors. Though not shown, persisted themes 214 comprise respective color palette data as well. Theme manager 202 may be configured to load current theme data 204 from theme data store 214 using current theme initialization data 218A. A current background image or wallpaper 208 is stored for display as is an optional screen saver image 210 for display over at least a portion of the display to hide the content thereof when the device has not been active for a period of time or upon initiation by the user. Volatile store 126 may be loaded with background and screen saver image data from persistent store 124 using initialization data 218B and 218C.

Theme manager component 202 may be configured to facilitate a user to choose a particular stored theme 214 as current theme 204, persisting the choice as initialization data 218A. Similarly, choice of screen saver and background may be facilitated. More importantly, however, in accordance with the present embodiment, theme manager 202 is adapted to dynamically determine a color palette for use with a selected background image for current theme 204 from color identified by a color determiner component 220. Color determiner component 220 is configured to analyze an image (e.g. current background 208) to determine one or more colors defining the image. The identified color is then used to dynamically determine the color palette for use with the image in the current theme as discussed further below. The color palette data may be persisted to theme data store 214, for example, defining a user-defined theme or current theme 218A.

Store 126 also comprises a Web browser application component useful for navigating Web pages via network 104. Web browser component 212 is capable of saving to persistent store 124 images (e.g. one or more of images 1-N 216) retrieved during browsing. Optionally, Web browser 212 may also be adapted to retrieve and persist additional themes (e.g. theme data defining a Theme D (not shown)). Persons of ordinary skill in the art will appreciate that device 102 may be adapted for storing images and themes in different or additional manners such as via removable storage media (flash memory, DVD, CD-ROM, floppy or other diskettes or tapes, all not shown), other data communication such as e-mail or IM communications via subsystem 111, via short-range communications 140, or via data port 130 such as when device 102 is coupled to a desktop computer via a cable connection (e.g. USB) as discussed above. Images and themes may be stored to store 124 at configuration time during manufacturing as well.

Thus theme manager 202 may load and apply predefined theme data or determine dynamically and apply theme data in response to a users choice of background image. The dynamically-determined data may be persisted for reuse. However, alternatively the dynamically-determined data may be regenerated again upon start-up, for example.

FIG. 3 and FIG. 4 are flowcharts of operations 300 and 400 for dynamically generating color palette data with which to theme user interface elements. Operations start 301 with the invocation of theme generation 302 such as by a users choice of a new background image. As is known, an image management interface (not shown) may be invoked to list images 216 to a user. One image management choice may be the selection of an image to be used as the current background 208. The choice of a particular image is persisted as initialization data 218B (e.g. a pointer or file name, flag etc.). In accordance with the present embodiment, the choice of current background 208 invokes a theme generation operation 302. At step 304, the new color palette to apply is determined from the background image 208. At step 306, the new color palette is applied in the current theme as color palette 206 and operations end 307.

Operations 400 illustrate an embodiment of new color palette determination step 304. Following a start 401, a predominant color of image 208 is identified using statistical analysis of the image (step 402). In one embodiment a simple histogram analysis may be performed counting instances of the colors of the image and the predominant color determined based on the count. The source for the analysis may be the raw image itself or a blended low pass filtered version thereof. A blended low pass version of the image helps to capture what the human eye registers and avoids spurious peaks in the histogram.

A new color palette is defined (step 404) using the predominant color. A color wheel-like table (not shown) may be used to select matching colors automatically and operations 400 end (step 405). Alternatively, additional predominant colors may be determined from image 208 in a similar manner to define the color palette. For example, many graphic images such as logos or trademarks are defined using a relatively few contrasting colors for heightening impact. Two or three of these colors may be determined using the color determiner to define the color palette. A table or difference mechanism may be used to review the determined colors and identify appropriate contrasting color matches for the color palette. For example, if the predominant colors are green, white and yellow, it may be preferred to define the color palette with two colors that provide greater contrast (e.g. green and white rather than green and yellow).

Another alternative approach (not shown) permits a user to select between several color combinations that are determined to blend well with the image. Steps 402 and 404 may be adapted to identify two or more new palette candidates such as by determining two or predominant colors and respective matching colors to correspond with these predominant colors or by providing different color matches to one predominant color to define different candidate palettes. A user may be presented with color swatches or other images representative of the candidate palettes for selection to define the color palette. Alternatively, a candidate palette may be applied (step 306, as adapted) and the user asked to confirm the candidate palette as the new color palette.

Persons of ordinary skill in the art will appreciate that a color palette for a particular image may be generated once and a persisted to store 124 (e.g. at step 404) for subsequent use on a re-start. The color palette may be stored along with an association to the image used to define the palette as a new theme (214) for example. If the user changes background images and reselects an image for which a color palette was previously generated, the color palette need not be regenerated. As such, a determination at or about step 302 may be made whether an associated color palette exists. If so, step 304 is avoided in favor of retrieving the existing color palette from store 124 and step 306 applies the retrieved color palette. In a mobile device environment where persistent store 124 may be relatively small, it may not be preferred to store color palette information in this manner and regeneration of the color palette on-the-fly may be preferred.

Theme generation may be initiated by the selection of a background image but persons of ordinary skill in the art will appreciate that a color palette may be generated alternatively from other identified images such as from a screen saver image. A user may like to theme their device with the colors of their native country's flag or favourite team logo. An image of the flag or logo may be identified to the theme manager and a color palette generation feature invoked even though flag or logo is not defined as component of the user interface such as the background image or screen saver.

Dynamic color palette generation allows on-the-fly theme generation, which makes theme GUIs flexible and removes dependencies on predefined themes. Predefined theme storage may be constrained by the available persistent memory of a device. Adding themes such as by downloading may be avoided. Automatic generation to match images allows balancing to avoid unattractive contrasts between theme colors and image colors.

What is claimed is:

1. A method of customizing a user interface on a color display of a computer system comprising the steps of:
   receiving input via the computer system identifying a color image;
   defining a color palette sourced from one or more of at least one predominant color of the color image;
   storing the color palette to a persistent store of the computer system wherein the color palette is associated with the color image for subsequent use in rendering of elements of the user interface on the color display when a subsequent input to reselect the color image is received.

2. The method of claim 1 further comprising retrieving the color palette from the persistent store of the computer system for customizing the user interface upon receiving said subsequent input to reselect.

3. The method of claim 1 wherein the computer system comprises a wireless mobile device.

4. The method of claim 1 wherein the step of storing is in accordance with a capacity of the persistent store and wherein the method comprises regenerating the color palette when said subsequent input is received if the color palette is not stored to the persistent store.

5. The method of claim 1 wherein the color image is sourced from a Web page, an e-mail, or an IM communication.

6. The method of claim 1 wherein the elements comprise one or more of borders, controls, icons, cursors, object borders and shadowing, menus, lists, text boxes or input boxes, push buttons, radio buttons, scrollbars, and toolbars.

7. The method of claim 1 wherein the step of defining comprises performing statistical analysis of data of the image to determine the at least one predominant color of the color image.

8. The method of claim 1 wherein the step of defining is automatic in response to the step of receiving input.

9. A computer readable memory having recorded thereon instructions to configure a processor of a computer system having a color display and a customizable user interface to:
   receive input via the computer system identifying a color image;
   define a color palette sourced from one or more of at least one predominant color of the color image;
   store the color pallette to a persistent store of the computer system wherein the color palette is associated with the color image for subsequent use in rendering of elements of a user interface of the computer system on the color display when a subsequent input to reselect the color image is received.

10. A computer readable memory of claim 9 wherein the color image is sourced from a Web page, an e-mail, or an IM communication.

11. A computer readable memory of claim 9 wherein to store the color palette is in accordance with a capacity of the persistent store and wherein the instructions further configure the processor regenerate the color palette when said subsequent input is received if the color palette is not stored to the persistent store.

12. A computer readable memory of claim 9 wherein the elements comprise one or more of borders, controls, icons, cursors, object borders and shadowing, menus, lists, text boxes or input boxes, push buttons, radio buttons, scrollbars, and toolbars.

13. A computer readable memory of claim 9 wherein the instructions further configure the processor to perform statistical analysis of data of the image to determine the at least one predominant color of the color image.

14. A computer readable memory of claim 9 wherein the instructions further configure the processor to automatically define the color palette in response to receiving input via the computer system identifying a color image.

15. A system for customizing a user interface on a color display of a computer system, the system comprising:
   a color display; and
   a processor and memory configured to:
      receive input via the computer system identifying a color image;

define a color palette sourced from one or more of at least one predominant color of the color image;

store the color palette to a persistent store of the computer system wherein the color palette is associated with the color image for subsequent use in rendering of elements of the user interface on the color display when a subsequent input to reselect the color image is received.

16. The computer system of claim 15 wherein the color image is sourced from a Web page, an e-mail, or an IM communication.

17. The computer system of claim 15 wherein the elements comprise one or more of borders, controls, icons, cursors, object borders and shadowing, menus, lists, text boxes or input boxes, push buttons, radio buttons, scrollbars, and toolbars.

18. The computer system of claim 15 wherein the step of defining comprises performing statistical analysis of data of the image to determine the at least one predominant color of the color image.

19. The computer system of claim 15 wherein the system is a wirele mobile device, 20. The computer system of claim 15, wherein to store the color palette is in accordance with a capacity of the persistent store and wherein the processor is further configured to regenerate the color palette when said subsequent input is received if the color palette is not stored to the persistent store.

* * * * *